US008925005B2

(12) United States Patent
Scott et al.

(10) Patent No.: US 8,925,005 B2
(45) Date of Patent: Dec. 30, 2014

(54) CUSTOM CONTENT CHANNEL

(75) Inventors: Charles Scott, Austin, TX (US); James L. Cansler, Pflugerville, TX (US); Scott White, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1658 days.

(21) Appl. No.: 12/184,102

(22) Filed: Jul. 31, 2008

(65) Prior Publication Data

US 2010/0031288 A1      Feb. 4, 2010

(51) Int. Cl.
*H04N 7/10*         (2006.01)
*H04N 5/445*        (2011.01)
*H04N 7/173*        (2011.01)
*H04N 21/262*       (2011.01)
*H04N 21/438*       (2011.01)
*H04N 21/458*       (2011.01)
*H04N 21/6547*      (2011.01)
*H04N 21/658*       (2011.01)

(52) U.S. Cl.
CPC ..... *H04N 7/17318* (2013.01); *H04N 21/26258* (2013.01); *H04N 21/4383* (2013.01); *H04N 21/458* (2013.01); *H04N 21/6547* (2013.01); *H04N 21/6581* (2013.01)

USPC .............................................. 725/34; 725/37

(58) Field of Classification Search
USPC ...................................................... 725/34, 47
See application file for complete search history.

(56) References Cited

U.S. PATENT DOCUMENTS

| 2008/0115173 | A1* | 5/2008 | Ellis et al. .................... 725/61 |
| 2008/0244681 | A1* | 10/2008 | Gossweiler et al. .......... 725/133 |
| 2008/0276279 | A1* | 11/2008 | Gossweiler et al. ............ 725/46 |
| 2009/0031368 | A1* | 1/2009 | Ling ............................... 725/87 |

* cited by examiner

*Primary Examiner* — Nasser Goodarzi
*Assistant Examiner* — Michael Hong
(74) *Attorney, Agent, or Firm* — Toler Law Group, PC

(57) ABSTRACT

Methods, systems and computer-readable media to provide custom video content via a custom content channel are disclosed. A method to display custom video content includes receiving a selection of a channel via a set top box (STB) device and determining whether the channel is a custom content channel. The method further includes accessing a play list associated with the custom content channel based on the determination. The play list identifies one or more video files stored at the STB device. The method also includes playing the one or more video files of the custom content channel to a display device coupled to the STB device.

24 Claims, 6 Drawing Sheets

| Receiver | Custom Ch. | Video File List | Channel Description | Start/Resume Location | File Exp. |
|---|---|---|---|---|---|
| STB/DVR ABC | 101 | Files A, B, C | ABC Resort & Hotel | A @ 00:00:00 | A @ Date A1<br>B @ Date A2<br>C @ No Exp. |
| 202 | 204 | 206 | 208 | 210 | 212 |

FIG. 2

| Receiver | Custom Ch. | Video File List | Channel Description | Start/Resume Location | File Exp. |
|---|---|---|---|---|---|
| STB/DVR DEF | 102 | Files D, E, F | DEF Electronics | D @ 00:00:00 | D @ Date D1<br>E @ Play #1<br>F @ Play #1 : Date D1 |
| 302 | 304 | 306 | 308 | 310 | 312 |

FIG. 3

| Receiver | Custom Ch. | Video File List | Channel Description | Start/Resume Location | File Exp. |
|---|---|---|---|---|---|
| STB/DVR Group GHI | 201 | Files G, H, I | GHI National Electronics | G @ 00:00:00 | G @ Date G<br>H @ Date G<br>I @ Date G |
| 402 | 404 | 406 | 408 | 410 | 412 |

FIG. 4

| Receiver | Custom Ch. | Video File List | Channel Description | Start/Resume Location | Remote Function-Video File Map | File Exp. |
|---|---|---|---|---|---|---|
| STB/DVR Group KLM | 202 | Files K, L, M | "Help & How-to" Equip A | A @ 00:00:00 | Key 1 = L<br>Key 2 = M @ 00:02:00<br>Key 3 = M @ 00:04:30 | K @ No Exp.<br>L @ No Exp.<br>M @ No Exp. |
| 502 | 504 | 506 | 508 | 510 | 514 | 512 |

FIG. 5

CUSTOM CONTENT CHANNEL

TECHNICAL FIELD

The present application relates generally to presentation of content via a set top box device.

BACKGROUND

Recent developments in digital technology have spurred the development and deployment of digital video transmission systems. Video content is typically provided by satellite, terrestrial broadcast, and by cable providers. More recently, video content has also been provided via the Internet Protocol (IP) by telecommunication service providers.

Video content may be received at end users' digital set top box (STB) devices, which decode the video content for display on video display devices (e.g., televisions) connected to the STB devices.

There are some end users, such as businesses, that provide custom video content to their customers. For example, a business, such as a ski resort may provide a custom video content ski channel for its guests, or an electronics chain may provide custom video content for its customers at all of its locations. Additionally, video content providers may provide a "help & how-to" custom video content channel for satellite and cable video transmission systems to demonstrate functionality and trouble shooting tips (e.g., use of a remote control device).

Currently, custom video content may be transmitted from a video content provider to end users via a dedicated channel or may be distributed to the end users via digital video disk (DVD). Transmitting custom video content over a dedicated channel is expensive, and bandwidth restrictions prevent providers from allocating dedicated channels to many end users, especially via satellite and cable transmission systems. DVD distribution requires manual effort and increases the risk of human error.

BRIEF DESCRIPTION OF THE DRAWINGS

Some embodiments are illustrated by way of example and not limitation in the figures of the accompanying drawings in which:

FIGS. 2-5 are example play lists to facilitate the provision of custom video content via a custom content channel;

DETAILED DESCRIPTION

Figure 1:
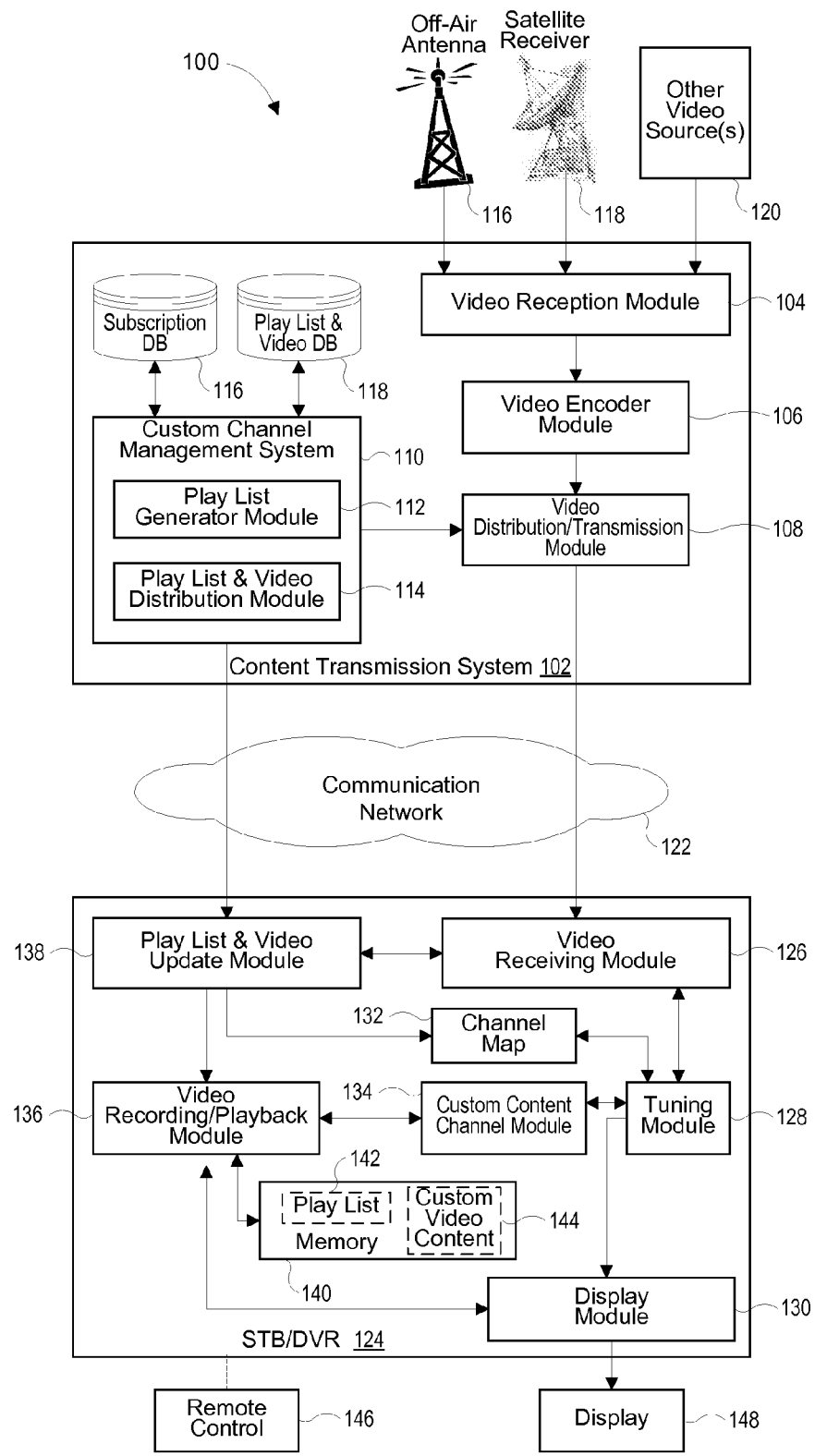
FIG. 1 is a high-level block diagram of an exemplary video distribution system that provides custom video content via a custom content channel of a STB/DVR device.

Systems, methods and computer-readable storage media to provide custom video content via a custom content channel are disclosed. In the following description, for the purposes of explanation, numerous specific details are set forth in order to provide a thorough understanding of example embodiments. It will be evident, however, to one skilled in the art, that an example embodiment may be practiced without all of the disclosed specific details.

In accordance with a particular embodiment, a method to display custom video content is disclosed. The method includes receiving a selection of a channel via a set top box (STB) device, determining whether the channel is a custom content channel, and accessing a play list associated with the custom content channel based on the determination. The play list identifies one or more video files stored at the STB device. The method also includes playing the one or more video files of the custom content channel to a display device coupled to the STB device.

In accordance with another embodiment, a set top box (STB) device to display custom video content is disclosed. The STB device includes a tuning module to receive selection of a channel and to determine whether the channel is a custom content channel. The STB device also includes a custom content channel module to access a play list associated with the custom content channel. The play list identifies one or more video files stored at the STB device. The STB device further includes a playback module to play the one or more video files of the custom content channel to a display device coupled to the STB device.

In accordance with another embodiment, a method to display custom video content is disclosed. The method includes determining whether at least one set top box (STB) device is subscribed to a custom content channel and generating a play list for the custom content channel. The play list identifies at least one custom content channel number and one or more video files. The method also include transmitting the generated play list and associated one or more video files to the at least one STB device for storage and display of the one or more video files indicated in the play list from the at least one STB device in connection with the custom content channel.

In accordance with another embodiment, a content transmission system is disclosed. The content transmission system includes a play list generator module and a distribution module. The play list generator module is to determine whether at least one set top box (STB) device is subscribed to a custom content channel and to generate a play list for the custom content channel. The play list identifies at least one custom content channel number and one or more video files. The distribution module is to transmit the generated play list and associated one or more video files to the at least one STB device for storage and display of the one or more video files indicated in the play list from the at least one STB device in connection with the custom content channel.

In accordance with yet another embodiment, there is provided a computer-readable storage medium. The computer-readable storage medium includes operational instructions that, when executed by a processor, cause the processor to receive a selection of a channel via a set top box (STB) device, determine whether the channel is a custom content channel, and access a play list associated with the custom content channel based on the determination. The play list identifies one or more media files stored at the STB device. The computer-readable storage medium also includes operational instructions that, when executed by a processor, cause the processor to play the one or more media files of the custom content channel to a display device coupled to the STB device.

FIG. 1 is a high-level block diagram of a particular illustrative embodiment of a video distribution system 100 that provides custom video content via a custom content channel of a set top box (STB)/digital video recorder (DVR) device. The video distribution system 100 includes a content transmission system 102, a set top box (STB)/digital video recorder (DVR) device 124, and multiple video sources 116, 118 and 120. Although one video transmission system 102 and one STB/DVR device 124 are shown and described for clarity and brevity, the video distribution system 100 may include multiple video transmission systems 102, with each video transmission system 102 servicing multiple STB/DVR devices 124. A communication network 122 enables communication between the content transmission system 102 and the STB/DVR device 124.

The communication network 122 may include one or more of a long haul transport network (e.g., gigabit Ethernet network, Asynchronous Transfer Mode (ATM) network, frame relay network), a wireless network (e.g., satellite, Wi-Fi, or other wireless networks), other public or private networks, or any combination thereof. The communication network 122 may also include connections, such as fiber to the home (FTTH), fiber to the node (FTTN), telephone (e.g., digital subscriber line (DSL)), coaxial cable, hybrid fiber/coaxial, wireless and combinations thereof. The foregoing is not exhaustive and alternate or additional communication networks 122 as well as connections may be employed to interconnect the content transmission system 102 to the STB/DVR device 124.

The content transmission system 102 includes a video reception module 104 that receives video content, such as video broadcasts, multicasts, and other video transmissions, from multiple video sources, including an off-air antenna 116, a satellite receiver 118, as well as one or more other video sources 120, which may include fiber feed sources, video servers and tape machines, which serve video content. The video content received by the video reception module 104 may be in a variety of formats, including the National Television System Committee (NTSC) format, the Advanced Television Systems Committee (ATSC), the Moving Pictures Experts Group (MPEG)-2 and MPEG-4 formats, the Digital Video Broadcasting (DVB) format, the Windows Media format, baseband digital format, and other available formats. The content transmission system 102 further includes a video encoder module 106 that cooperates with the video reception module 104 to provide the video content received by the video reception module 104 to a video distribution/transmission module 108 in a standardized format. More specifically, the video reception module 104 may decode the video content received in the aforementioned different formats into a standardized format. In turn, the video encoder module 106 may further encode the video content provided in the standardized format by the video reception module 104 into a digital format for ultimate distribution/transmission of the video content to the STB/DVR device 124. For example, the digital format may be MPEG-2, MPEG-4, as well as other formats. The video distribution/transmission module 108 is configured to distribute/transmit the video content to the STB/DVR device 124.

The content transmission system 102 also includes a custom channel management system 110 to generate a play list for custom video content, such as video files, to be played via a custom content channel of a STB/DVR device (e.g., STB/DVR device 124) or a group of STB/DVR devices. The custom channel management system 110 includes a play list generator module 112 to generate a play list for the STB/DVR device (e.g., STB/DVR device 124) or the group of STB/DVR devices and a play list and video distribution module 114 to distribute the generated play list and associated custom video content (e.g., video files) stored in play list and video database 118 to the STB/DVR device or the group of STB/DVR devices. As will be described below with reference to FIGS. 2-5, the play list may include indications that relate a particular STB/DVR device or group of STB/DVR devices to a particular custom channel number, custom video content (e.g., an identification of one or more video files), description of the custom video content, a video file and location in the video file with which the custom video content is to start or resume playing, and expiration data for the custom video content. The content of the play list may be used to update an electronic program guide (EPG) that may be transmitted via a separate process (not shown) to the STB/DVR device 124.

The custom channel management system 110 is coupled to a subscription database 116 and a play list and video database 118. The subscription database 116 maintains subscription data that indicates whether a STB/DVR device (e.g., STB/DVR device 124) or a group of STB/DVR devices are subscribed to a custom channel. The play list and video database 118 maintains the generated play list and associated video content data (e.g., video files) for the custom channel of each subscribed STB/DVR device (e.g., STB/DVR device 124) or group of STB/DVR devices. For example, based on whether the STB/DVR device 124 is subscribed to a custom content channel, the play list generator module 110 generates a play list (described below with reference to FIGS. 2-5) for a custom content channel for the STB/DVR device 124. The play list generator module 110 may store the generated play list in the play list and video database 118 until such time as the play list and associated video content data is distributed/transmitted to the STB/DVR device 124. The play list and video distribution module 114 distributes the generated play list and the associated video content data to the STB/DVR device 124. The distribution/transmission may be accomplished directly by the play list and video distribution module 114 (e.g., via a back channel) or via the video distribution/transmission module 108.

The STB/DVR device 124 is configured to receive video content conventionally distributed or transmitted from the content transmission system 102 for display, as well as receiving a play list and associated custom video content (e.g., one or more video files) for display via a custom content channel of the STB/DVR device 124. The STB/DVR device 124 includes a video receiving module 126, a tuning module 128, a display module 130, a channel map 132, a custom content channel module 134, a video recording/playback module 136, a play list and video update module 138, as well as a memory 140 that may maintain a play list 142 and associated custom video content 144. The STB/DVR device 124 is further configured to receive input from a remote control device 144 and to display video content via a display device 146.

The video receiving module 126 is configured to receive video content distributed or transmitted from the content transmission system 102, including video content from the different video sources 116, 118 and 120, and may also receive a play list and associated custom video content from the custom channel management system 110.

The tuning module 128 is configured to access the channel map 132 to determine what action or operation is to be performed based on a channel selection by the user received via the remote control 144. If the action or operation from the channel map 132 indicates that the selected channel is a standard channel provided by the content transmission system 102 from the video sources 116, 118 and 120, the tuning module 128 may instruct the video receiving module 126 to request video content associated with the selected channel from the content transmission system 102. If the action or operation from the channel map indicates that it is a custom content channel, the tuning module 128 may request the custom content channel module 134 to display the custom video content 144 (e.g., one or more video files) associated with the selected channel from the STB/DVR device 124.

The display module 130 is configured to receive video content from the tuning module 128 as well as custom video content 144 from the video recording/playback module 136, and is further configured to display the video content and the custom video content via the display device 146 coupled to the STB/DVR device 124.

The channel map 132 includes a listing of the channels available to be displayed by the STB/DVR device 124. The channel map 132 associates each channel with an action that may be executed or an operation that may be performed.

The custom content channel module 134 is configured to receive a request from the tuning module 128 to display custom video content 144 associated with the selected channel from the memory 140 of the STB/DVR device 124. In response to receiving such a request, the custom content channel module 134 is configured to accesses a play list 142 associated with the selected channel to identify the custom video content 144 (e.g., one or more video files) stored in the memory 140 of the STB/DVR device 124 to be displayed via the selected channel.

The video recording/playback module 136 is configured to receive the play list 142 and the associated custom video content 144 (e.g., one or more video files) from the play list and video update module 138 and to record the received play list 142 and the custom video content 144 to the memory 140 of the STB/DVR device 124. The video recording/playback module 136 is further configured to access the play list 142 and the associated custom video content 144 (e.g., one or more video files) in response to a request form the custom content channel module 134 for display of the custom video content 144 via the display module 130 coupled to the display device 148.

The play list and video update module 138 is configured to receive the play list 142 and the associated custom video content 144 (e.g., one or more video files), as well as updates thereof, from the content transmission system 102. The play list and video update module 138 is further configured to request the video recording/playback module 136 to store/update the play list 142 and the associated custom video content 144 in the memory 140 of the STB/DVR device 124. The play list and video update module 138 is further configured to update the channel map 132 with custom channel information that is identified in the play list 142.

The memory 140 is configured to maintain the play list 142 and the custom video content 144 (e.g., one or more video files) to facilitate the display of the custom video content 144 via the custom content channel of the STB/DVR device 124.

With reference to the operation of the STB/DVR device 124, the video receiving module 126 is configured to receive video content distributed or transmitted from the content transmission system 102, including video content from the different video sources 116, 118 and 120, and further configured to receive the play list 142 and the associated custom video content 144 (e.g., one or more video files) from the custom channel management system 110. In response to receiving the play list 142 and the associated custom video content 144, the video receiving module 126 is operable to transmit the play list 142 and the associated custom video content 144 to the play list and video update module 138. The play list and video update module 138 is operable to record/update the play list 142 and the associated custom video content 144 in the memory 140 of STB/DVR device 124 via the video recording/playback module 136. In another embodiment, the play list and video update module 138 may receive the play list 142 and the associated custom video content 144 from the custom channel management system 110 via communication network 122 and may then record/update the play list 142 and the associated custom video content 144 to the memory 140 of STB/DVR device 124 via the video recording/playback module 136.

The play list and video update module 138 may also be configured to update the channel map 132 with the custom channel information identified in the play list 142 to facilitate display of custom video content via the custom content channel. Also, the play list and video update module 138 may be configured to update an electronic program guide or EPG (not shown) with the custom channel information and the custom channel description identified in the play list 142. In another embodiment, the EPG may also be updated with the custom channel information and the custom channel description by the content transmission system 102. Thereafter, the updated EPG may be provided to the STB/DVR device 124 via a separate process from the content transmission system 102.

Further with reference to the operation of the STB/DVR device 124, in response to receiving a channel selection by a user, such as via a remote control device 146, the tuning module 128 accesses a channel map 132 to determine what action or operation is to be performed based on the channel selected by the user. If the action or operation indicates that the selected channel is a standard channel provided by the content transmission system 102 from the video sources 116, 118 and 120, the tuning module 128 may instruct the video receiving module 126 to request video content associated with the selected channel from the content transmission system 102. If the action or operation indicates that the selected channel is a custom content channel, the tuning module 128 may request the custom content channel module 134 to display custom video content associated with the selected channel from the memory 140 of the STB/DVR device 124.

In response to the request from the tuning module 128, the custom content channel module 134 is configured to access the play list 142 associated with the selected channel. The play list 142 identifies the custom video content 144 (e.g., one or more video files) stored in the memory 140 of the STB/DVR device 124 to be displayed via the selected channel. The custom content channel module 134 instructs the video recording/playback module 136 to play the identified custom video content 144, such as one or more video files according to the play list 142 for the selected channel. The video recording/playback module 136 is responsive to the custom content channel module 134 to play the identified one or more video files via the display module 130 to the display device 148.

The foregoing system enables the seamless or transparent provision of custom video content to the STB/DVR device 124. This enables the user to experience the custom video content in the same way as standard video content. In both instances, the user selects a channel that the user would like to display, such as via the remote control 146. When the user selects a standard channel, then video content is displayed conventionally from the content transmission system 102. When the user selects a custom content channel, then custom video content 144 is displayed from the memory 140 of the STB/DVR device 124. To the user, the provision of custom video content via a custom content channel looks and feels like the provision of standard video content via the usual channel selection. This seamless or transparent look and feel is achieved by defining or creating a custom channel entry in the channel map 132, which maintains other channel entries for standard video content transmitted from the content transmission system 102, allowing the user to select standard video content or custom video content by simply changing the channel. This user experience differs significantly from reproducing or playing video content recorded conventionally in a DVR. In the DVR experience, a user generally presses a DVR button, which displays a user interface that lists recordings stored by the DVR. Thereafter, upon user selection of a particular recording, the DVR displays that recording to the user.

During play of the custom video content via the custom content channel, the user may rewind, fast forward, skip to a previous video file or a next video file by using associated buttons of the remote control device 146. Furthermore, the video files may provide interactive opportunities or experience to the user. For example, a "help & how-to" custom video channel that provides custom video content related to the remote control device 146 may allow the user to select a button on the remote control 146 that corresponds to a particular video file or a location in a video file associated with that button or function. Upon selection of the button via remote control device 146, the custom content channel module 134 requests the video recording/playback module 136 to play a particular video file or play at a particular location of a current video file. At conclusion of play, such as when the user requests a different channel or indicates that the STB/DVR device 124 is to be turned off, the custom channel content module 134 may retain an indication of a video file and location in the video file at which the user left off the display of the custom video channel. This indication may be saved to the play list 142 and may further be used to resume play of the custom video channel when the user returns to the custom video channel, in response to the user selecting the custom video channel via the remote control device 146 or in response to the user powering up the STB/DVR device 124 via the remote control device 146.

The STB/DVR device 124 enables the seamless or transparent provision of custom video content together with standard video content to the user. This enables the user to experience the custom video content in the same way as standard video content, while also providing the user with interactive opportunities to enrich the user experience.

The modules 126-138 of the STB/DVR device 124 may be implemented in hardware, firmware or software. More specifically, dedicated hardware implementations, such as application specific integrated circuits, programmable logic arrays and/or other hardware devices, may be constructed to implement the functionality of one or more of modules 126-138. Alternatively or in addition, one or more of the modules 126-138 may be implemented in software. The software may be stored in the memory 140 and executed by a processor (not shown). Also, one or more of the modules 126-138 may be implemented in firmware.

FIGS. 2-5 are example play lists to facilitate the provision of custom video content via a custom content channel in accordance with FIG. 1. As illustrated in FIGS. 2-5, any of the example play lists may be maintained by the example STB/DVR device 124 to facilitate display of custom video content via a custom video channel.

FIG. 2 illustrates a play list 200 that may include an identification 202 of a receiver with which it is associated (e.g., the STB/DVR device 124 of FIG. 1), a custom channel number 204 that will display the custom video content (e.g., channel 101), a video file list 206 that identifies one or more video files (custom video content) that are to be played when the custom channel number 204 is selected at the receiver, a channel description of the custom video channel 208, a start/resume location 210 that identifies a video file from the video file list 206 and a location within the video file from which the custom video channel is to start playing when the user switches the channel of the receiver (e.g., the STB/DVR device 202) to the custom channel number 204, and file expiration data 212 that identifies expiration rules for the one or more video files of the video file list 206.

The start/resume location 210 may be updated by the custom content channel module 134 to indicate a current video file and a location within the current video file when a user changes the channel from the custom channel number 204 or switches the STB/DVR device 124 off For example, data such as, "file B @00:32:15," may be stored at the start/resume location 210 to facilitate resumption of play from a last viewed video location when the user switches back to the custom channel number 204. Alternatively, the custom content channel module 134 may not update an original start/resume location 210 as provided from the content transmission system 102. For example, original data such as, "A @00:00:00," stored at the start/resume location 210 may facilitate resumption of play always from a beginning or a first video file identified in video file list 206.

The expiration rules in the file expiration data 212 may identify a date (e.g., "file A @ date A1") on which a video file is to be expired and not played via the custom channel number 204, or may indicate that the video file is not to be expired (e.g., "file C @ No Exp"). The expiration rules (e.g., dates) may be the same for all video files identified in a particular play list or may be different for various video files identified in the play list. As an alternative, a video file that is not to be expired may have no expiration data in 212 (not shown). The expiration rules may also be implemented without file expiration 212 of play list 200. For example, each file identified in the video file list 206 and stored by the STB/DVR device 124 in memory 140 may include an expiration date (e.g., as a file date of the video file). If a file is not to be expired, it may have as the expiration date an invalid date (e.g., 00/00/0000) that may indicate that the file is not to be expired. When a file is expired according to an expiration rule, the custom content channel module 134 deletes the identification of the file from the video file list 206. In addition, the custom content channel module 134 may also delete the expired file from the memory 140.

FIG. 3 illustrates a play list 300 that is similar to the play list 200 of FIG. 2, but for a different receiver, as indicated by receiver identification 302. Custom video content may also be played via a different channel number, as indicated by 304 (e.g., custom channel number 102). Also, different video files (custom video content) may be identified in the video file list 306 and a different channel description may be indicated by the channel description 308. Similarly, a different start/resume location may be indicated by 310. The expiration rules in file expiration data 312 may identify a date (e.g., "D @ Date D1"), a number of play times (e.g., "E @ Play #1") or the earlier of the date or the number of play times (e.g., "F @ Play #1: Date D1"), that a file is to be expired and not played via the custom channel number 304.

FIG. 4 illustrates a play list 400 that is similar to the play list 200 of FIG. 2 and to the play list 300 of FIG. 3. However, the play list 400 may identify a group of receivers (e.g., STB/DVR devices), as indicated by the receiver identification 304, which may receive the same, similar, or different play lists. Play lists, such as play list 400, may be used for national hotels, restaurants, retail chains, as well as many other multi-location businesses. For example, the play list 400 transmitted to different receivers of the group may identify the same custom channel number as identified in 404 (e.g., channel 201), or a different custom channel number identified by 404 for each receiver or for each location that may have multiple receivers. The video files (custom video content) of video file list 406 may be the same, may overlap or may be different between different receivers of the group or between different locations having multiple receivers. For example, a first video file identified in the video file list 406 (e.g., File G) may be specific to each particular location of a national chain, while the remaining video files (e.g., Files H, I) may be generic (the same) across the locations of the national chain. The channel description 408 may be the same for all locations or may be different for one or more locations. The start/resume location 410 and file expiration data 412 may function similarly for the different receivers as described above in relation to FIGS. 2 and 3. It is noted that the video files identified by the video file list 406 may be expired at the same time for all locations, at a different time for each location, or at a different time for each receiver.

FIG. 5 illustrates a play list 500 that is similar to the play list 400 of FIG. 4. The play list 500 may be implemented to provide "help and how-to" information as indicated by 508 via a custom channel number 504 to a group of receivers identified in 502. Each different group of receivers may receive a different play list and associated custom video content as identified by video file list 506. For example, a group of receiver may be organized as the group of receivers 502 in that the receivers employ a particular type of equipment (e.g., STB/DVR devices that are manufactured by a particular vendor). The start/resume location 510 and the file expiration 512 may be similar to the above play lists of FIGS. 2-4. A remote control function-video file map 514 may also be provided to facilitate an interactive experience for the user as described hereinabove in relation to FIG. 1. The remote function-video file map 514 may be organized to map particular controls or functions of the remote control device 146 to particular video files or portions of video files in the video file list 506. For example, a user may select a button or function on the remote control device 146 (e.g., key 1) and a video file of 506 that is mapped to that button or function by 514 (e.g., "Key 1=L") may be displayed. As another example, a user may select another button or function on the remote control device 146 (e.g., key 1 or key 2) and a corresponding location of a video file of 506 is mapped to that button or function by 514 (e.g., "Key 2=M @00:02:00", or Key 3=M @00:04:30") may be displayed.

Figure 6:
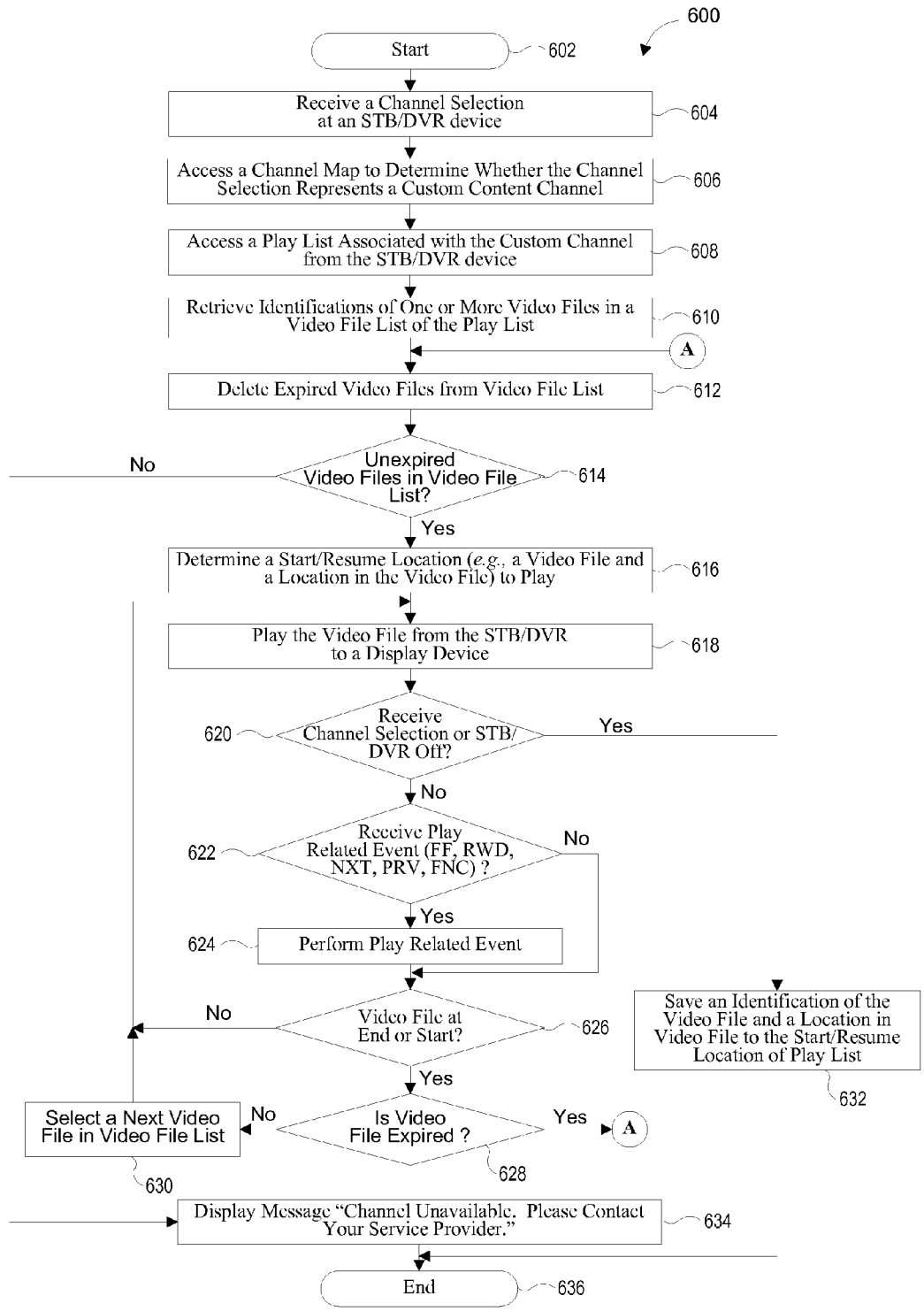
FIG. 6 is a flowchart that illustrates an example method of playing custom video content via a custom content channel.

FIG. 6 is a flowchart that illustrates an example method 600 for playing custom video content via a custom content channel. The method 600 starts at operation 602. At operation 604, a channel selection is received from a user at the STB/DVR device 124. At operation 606, the channel map 132 is accessed to determine whether the user's channel selection represents a custom content channel. At operation 608, a play list associated with the custom content channel is accessed, and at operation 610 identifications of one or more video files (custom video content) are retrieved from a video file list of the play list. At operation 612, expired video files are deleted from the video file list. At operation 614, a determination is made whether the video list includes unexpired video files. If there are no unexpired video files in the video file list, the method 600 continues at operation 634, where a message is displayed indicating that "Channel Unavailable, Please Contact Your Service Provider", and the method 600 ends at operation 636. Otherwise, if there are unexpired video files in the video file list, the method 600 continues at operation 616 to determine a video file and a location in the video to play. At operation 618, the video file is played from the STB/DVR device 124 starting at the location in the video file.

At operation 620, a determination is made whether the user has selected another channel or has indicated that the STB/DVR device 124 is to be turned off This determination may be based on receiving an indication from the tuning module 128. If it is determined that another channel has been selected or it is indicated that the STB/DVR device 124 is to be turned off, the method 600 continues at operation 632 where an identification of the video file currently playing and a location in the video file is saved to the play list. The method 600 thereafter ends at operation 636. If, however, no channel selection or off indication is received at operation 620, the method 600 continues at operation 622 where it is determined whether a play related event has been received, such as fast forward, rewind, next video file, previous video file, or selection of a function or a button related to an interactive experience. If a play related event has been received, the play related event is performed. If a play related event has not been received, the method 600 continues at operation 626, where a determination is made whether the video file is at a start or an end of the video file. If the video file is not at its end or its start, the method 600 continues at operation 618 to continue playing the video file. If, however, the video file is at the end or the start, at operation 628, a determination is made whether the video file is expired. If the video file is expired as determined at operation 628, the method 600 continues at operation 612. It is noted that because the video file indication of the ended file is deleted in the video file list at operation 612, a next unexpired video file indicated in the video file list may be the file that is determined for play at operation 616 and played at operation 618. However, if the video file is not expired as determined at operation 628, the method 600 continues at operation 630 to select a next video file from the video file list. The method 600 continues at operation 618 by playing the next video file.

Figure 7:
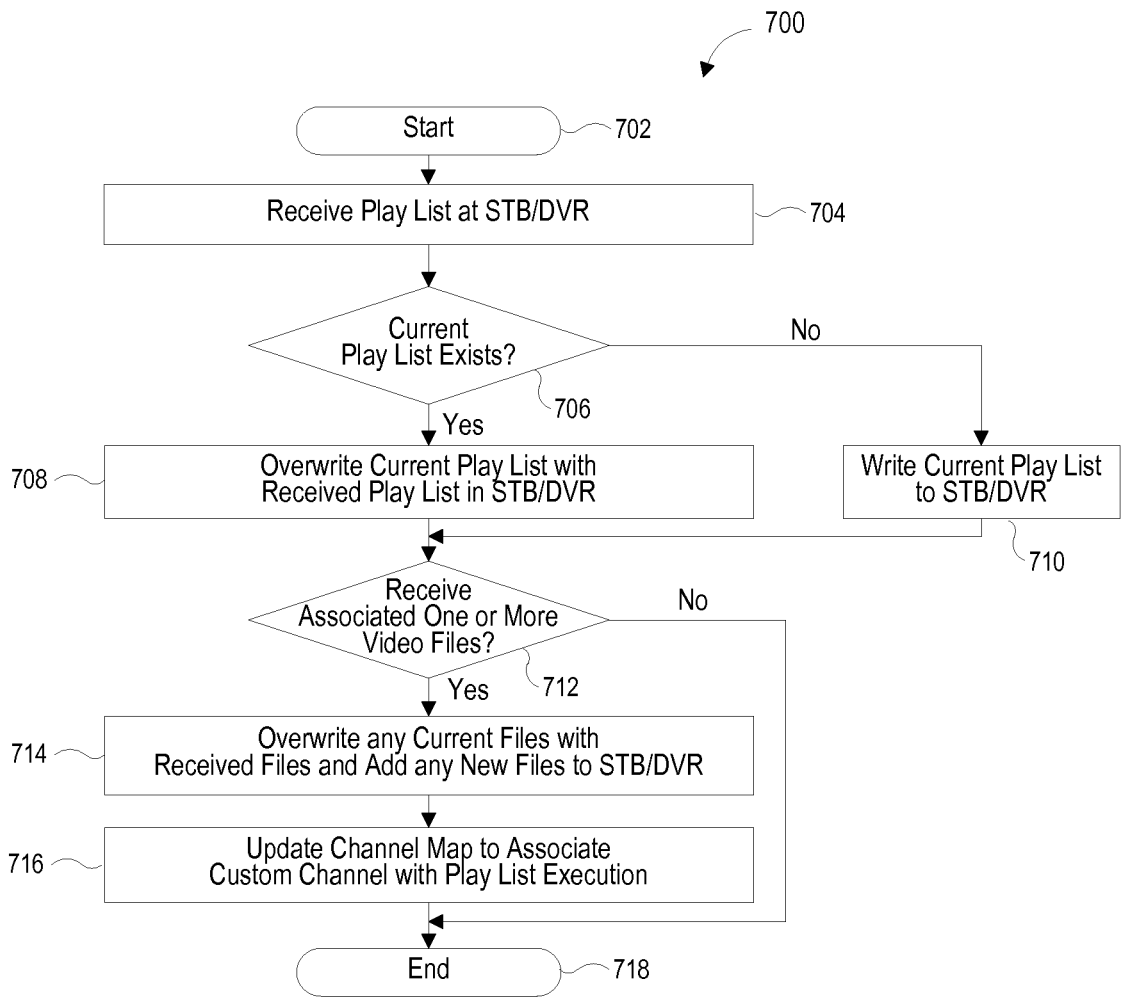
FIG. 7 is a flowchart that illustrates an example method of updating a play list and custom video content.

FIG. 7 is a flowchart that illustrates an example method 700 of updating a play list and custom video content. The method 700 begins at operation 702. At operation 704, a play list is received at the STB/DVR device 124. At operation 706, a determination is made whether there exists a current play list at the STB/DVR device 124 that is associated with the same custom content channel as the received play list. This may be accomplished by comparing file names of the play lists or the custom channel numbers of the play lists. If it is determined that a current play list exists, it is overwritten at operation 708 with the received play list. If it is determined that a current play list does not exist, the received play list is simply written to the STB/DVR device 124. The method 700 continued at operation 712, at which a determination is made whether one or more video files (custom video content) associated with the received play list are received. If one or more files are received at operation 712, then at operation 714, any current video files that may have the same names as those video files received are overwritten with the received video file and any new video files are stored to the STB/DVR device 124. At operation 716, the channel map is updated to associate the custom channel with the received play list execution. If no video files are received at operation 712, the method 700 ends at operation 718.

Figure 8:
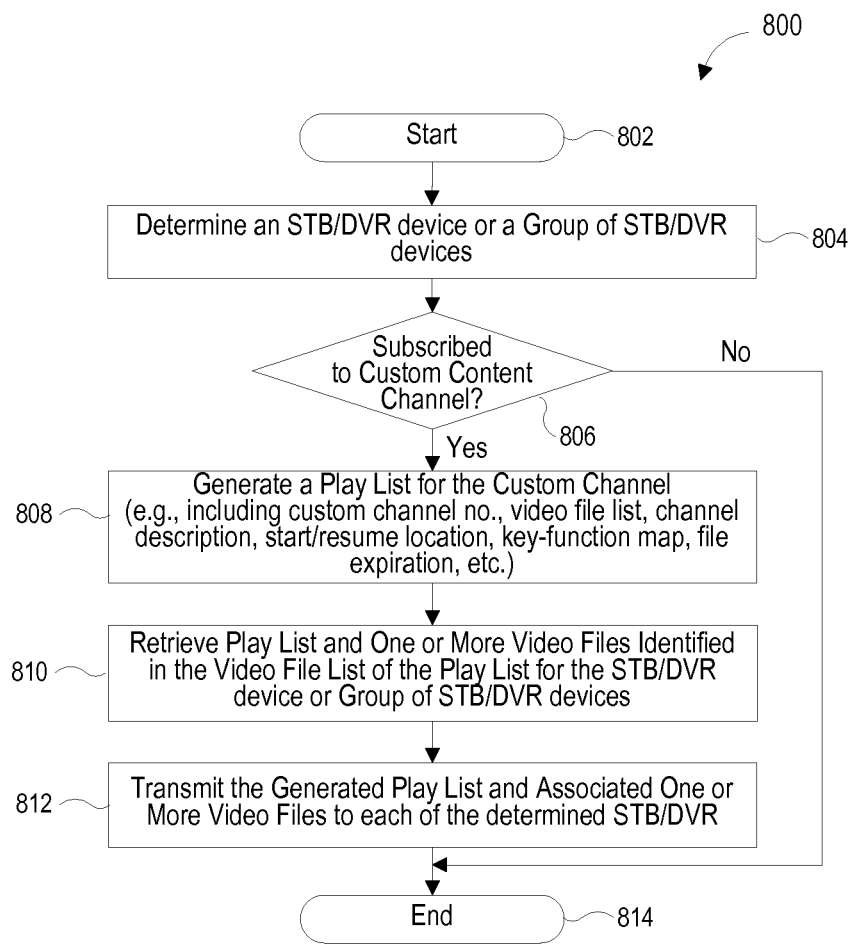
FIG. 8 is a flowchart that illustrates an example method for generating and distributing a play list and custom video content.

FIG. 8 is a flowchart that illustrates an example method 800 of generating and distributing a play list and custom video content. The method 800 begins at operation 802. At operation 804, a STB/DVR device or a group of STB/DVR devices is determined. At operation 806, a determination is made whether the STB/DVR device or the group of STB/DVR devices is subscribed to a custom content channel. If STB/DVR device or the group of STB/DVR devices is not subscribed, the method 800 ends at operation 814. If the STB/DVR device or the group of STB/DVR devices is subscribed, the method 800 continues at operation 808, where a play list associated with the custom content channel for the STB/DVR device or the group of STB/DVR devices is generated. The play list may include a custom channel number, a video file list (custom video content), a custom video channel description, a start/resume location, a key-function map, a file expiration, and other data associated with the custom content channel. The data of the play list for the STB/DVR device or the group of STB/DVR devices may be stored and maintained by the play list and video database 118. At operation 810, the generated play list and one or more video files identified in the play list for the STB/DVR device or group of STB/DVR devices are retrieved from the play list and video database 118. At operation 812, the generated play list and one or more video files identified in the play list are transmitted to the STB/DVR device or the group of STB/DVR devices. The method 800 ends at operation 814.

In accordance with FIG. 1-8, the custom video content displayed via the custom content channel may be expanded to other media, such as audio files to facilitate a radio station via the STB/DVR device 124, and/or animation files (e.g., Flash or Shockwave files) to facilitate a more diverse custom media content experience for the user.

Figure 9:
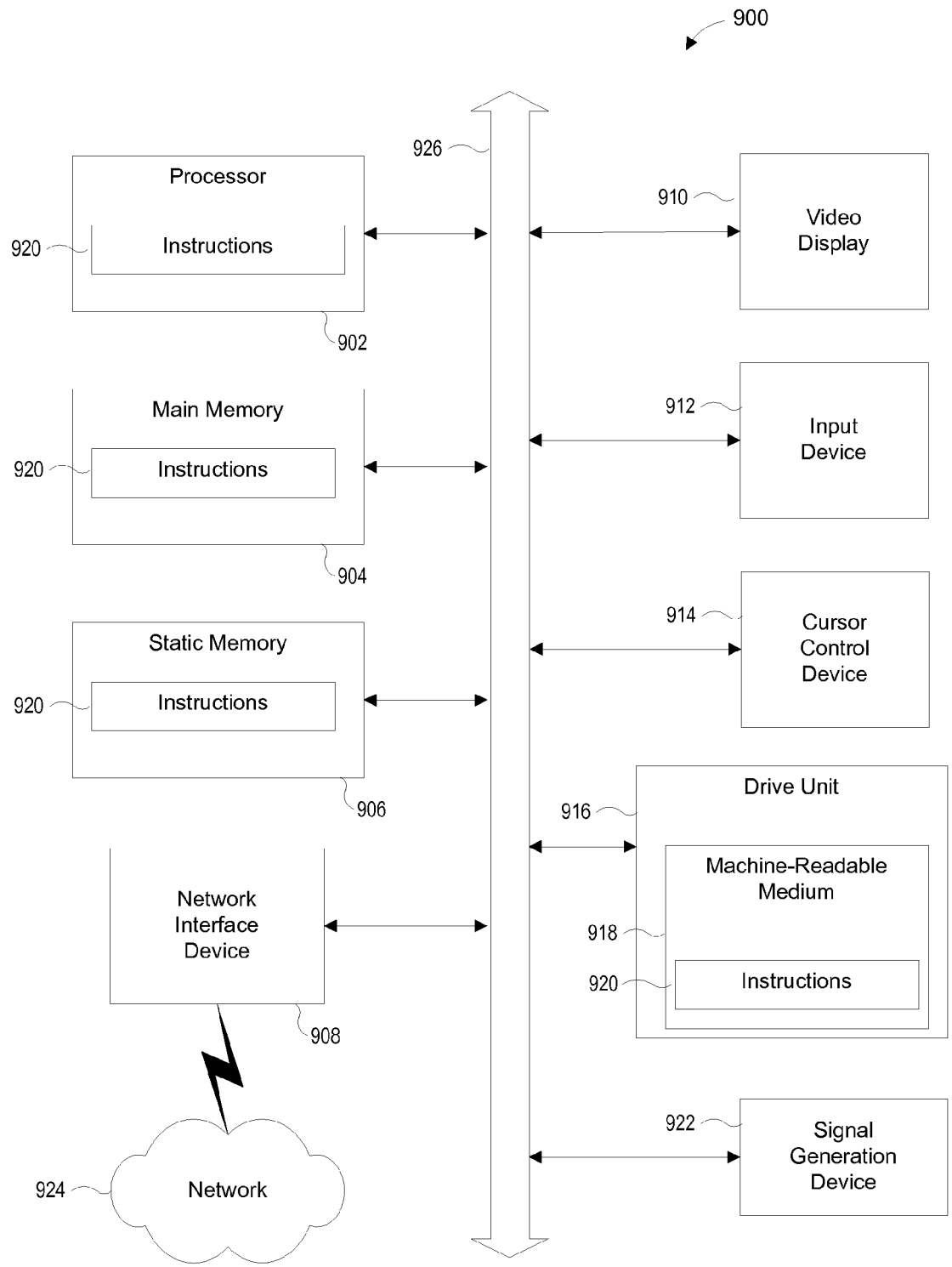
FIG. 9 is a block diagram of an illustrative embodiment of a general computer system.

FIG. 9 illustrates an example embodiment of a general computer system 900. The computer system 900 can include a set of instructions that can be executed to cause the computer system 900 to perform any one or more of the methods or computer based functions disclosed herein. The computer system 900, or any portion thereof, may operate as a standalone device or may be connected, e.g., using a network, to other computer systems or peripheral devices.

In a networked deployment, the computer system 900 may operate in the capacity of an Internet Protocol television (IPTV) server, such as a video server or application server, or a set-top box device. The computer system 900 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 926. As shown, the computer system 900 may further include a video display unit 910, such as a liquid crystal display (LCD), an organic light emitting diode (OLED), a projection unit, a television, a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 922, such as a speaker or remote control, and a network interface device 908.

In a particular embodiment, as depicted in FIG. 9, the disk drive unit 916 may include a computer-readable medium 918 in which one or more sets of instructions 920, e.g., software, can be embedded. Further, the instructions 920 may embody one or more of the methods or logic as described herein. In a particular embodiment, the instructions 920 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs tangibly embodied in a processor-readable medium and may be executed by a processor. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 920 or receives and executes instructions 920 responsive to a propagated signal, so that a device connected to a network 924 can communicate voice, video or data over the network 924. Further, the instructions 920 may be transmitted or received over the network 924 via the network interface device 908.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a medium that is equivalent to a tangible storage medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols.

Such standards and protocols are periodically superseded by faster or more efficient equivalents having essentially the same functions. Accordingly, replacement standards and protocols having the same or similar functions as those disclosed herein are considered equivalents thereof Thus, systems, methods and computer-readable storage media to provide custom video content via a custom content channel have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. §1.72(b) and will allow the reader to quickly ascertain the nature of the technical disclosure. It is submitted with the understanding that it will not be used to interpret or limit the scope or meaning of the claims.

In the foregoing description of the embodiments, various features may be grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment.

What is claimed is:

1. A method to display custom video content, the method comprising:
   receiving a selection of a channel via a media device;
   determining whether the channel is a custom content channel;
   accessing a play list associated with the custom content channel based on the determination, the play list identifying video files stored at the media device, the play list including file expiration data that identifies expiration rules for the video files, wherein the file expiration data includes a first expiration date for a first video file of the video files and a second expiration date for a second video file of the video files, and wherein the first expiration date is different from the second expiration date;
   determining whether a particular video file of the video files has expired,
      wherein the first video file expires based on the first expiration date and the second video file expires based on the second expiration date, and
      wherein, when the file expiration data includes both the first expiration date and a number of play times for the first video file, the first video file expires on an earlier of the first expiration date and being played the number of play times;
   removing an indicator of the particular video file from the play list; and
   playing video files remaining on the play list by use of a display device coupled to the media device.

2. The method of claim 1, wherein determining whether the channel is the custom content channel comprises accessing a channel map to determine whether the channel is the custom content channel.

3. The method of claim 1, wherein playing the video files remaining on the play list comprises:
   identifying a third video file from the video files remaining on the play list and a location in the third video file from which to play the third video file, wherein the location in the third video file is identified based on a location indicator in the play list; and
   playing the third video file from the identified location.

4. The method of claim 1, further comprising:
   receiving one of a selection of a different channel and an off indication at the media device; and
   saving an indication of a currently playing video file and a location in the currently playing video file in the play list.

5. The method of claim 1, further comprising:
   receiving a play related event related to a third video file of the custom content channel;
   performing the play related event;
   determining whether the third video file is at a beginning or at an end;
   selecting, based on the determination of whether the third video file is at the beginning or at the end, a previous video file or a next video file from the video files remaining on the play list; and
   playing the selected video file of the custom content channel.

6. The method of claim 1, further comprising:
   receiving the play list and the video files from a content transmission system;
   storing the play list and the video files to the media device; and
   updating a channel map to associate the custom content channel with execution of the play list.

7. The method of claim 1, wherein the file expiration data further includes a number of play times for a third video file, and wherein the third video file expires after being played the number of play times.

8. The method of claim 1, further comprising receiving a selection of a first remote control key of a plurality of remote control keys and playing the first video file, wherein the play list includes remote control key mapping data identifying the particular video file of the video files for a particular remote control key of the plurality of remote control keys, and wherein the remote control key mapping data maps the first video file to the first remote control key.

9. The method of claim 5, further comprising:
   deleting an identification of the third video file from the play list in response to the third video file being expired.

10. The method of claim 9, further comprising displaying a message to the display device that the custom content channel is unavailable when all of the video files of the play list are expired.

11. A media device to display custom video content, the media device comprising:
a processor;
a tuning module configured to receive selection of a channel and to determine whether the channel is a custom content channel;
a custom content channel module configured to:
access a play list associated with the custom content channel, the play list identifying video files stored at the media device, the play list including file expiration data that identifies expiration rules for the video files, wherein the file expiration data includes a first expiration date for a first video file of the video files and a second expiration date for a second video file of the video files, and wherein the first expiration date is different from the second expiration date;
determine whether a particular video file of the video files has expired,
wherein the first video file expires based on the first expiration date and the second video file expires based on the second expiration, and
wherein when the file expiration data includes both the first expiration date and a number of play times for the first video file, the first video file expires on an earlier of the first expiration date and being played the number of play times; and
remove the particular video file from the play list; and
a playback module configured to play video files remaining on the play list by use of a display device coupled to the media device.

12. The media device of claim 11, further comprising a channel map that associates the custom content channel with execution of the play list by the custom content channel module.

13. The media device of claim 11, wherein:
the custom content channel module is further configured to identify a third video file from video files remaining on the play list and a location in the third video file from which to play the third video file; and
the playback module is further configured to play the third video file from the identified location.

14. The media device of claim 11, wherein:
the tuning module is further configured to receive one of a selection of a different channel and an off indication at the media device; and
the custom content channel module is further configured to store an indication of a currently playing video file and a location in the currently playing video file to the play list.

15. The media device of claim 11, wherein the custom content channel module is further configured to:
receive a play related event related to a third video file of the custom content channel;
perform the play related event via the playback module;
determine whether the third video file is at a beginning or at an end;
select, based on the determination, a previous video file or a next video file from the remaining video files; and
play the selected video file of the custom content channel to the display device via the playback module.

16. The media device of claim 11, further comprising an update module configured to receive the play list and the video files from a content transmission system and to store the play list and the video files at the media device, the update module further configured to update a channel map to associate the custom content channel with execution of the play list by the custom content channel module.

17. The media device of claim 15, wherein the custom content channel module is further configured to:
determine whether the third video file is expired; and
delete an identification of the third video file from the play list.

18. A method to display custom video content, the method comprising:
determining whether a media device is subscribed to a custom content channel;
generating a play list for the custom content channel, the play list identifying a custom content channel number and video files, the play list including file expiration data that identifies expiration rules for the video files, wherein the file expiration data includes a first expiration date for a first video file of the video files and a second expiration date for a second video file of the video files, and wherein the first expiration date is different from the second expiration date;
determining whether a particular video file of the video files has expired,
wherein the first video file expires based on the first expiration date and the second video file expires based on the second expiration, and
wherein when the file expiration data includes both the first expiration date and a number of play times for the first video file, the first video file expires on an earlier of the first expiration date and being played the number of play times;
removing the particular video file from the play list to generate a modified play list; and
transmitting the modified play list and the associated remaining video files to the media device for storage and display of remaining video files indicated in the modified play list from the media device in connection with the custom content channel.

19. The method of claim 18, further comprising:
storing the modified play list and the remaining video files prior to transmission;
retrieving the stored play list and the remaining video files; and
transmitting the modified play list and the remaining video files via a channel to the media device.

20. A content transmission system, the content transmission system comprising:
a processor;
a play list generator module to:
determine whether a media device is subscribed to a custom content channel;
generate a play list for the custom content channel, the play list identifying at least a custom content channel number and video files, the play list including file expiration data that identifies expiration rules for the video files, wherein the file expiration data includes a first expiration date for a first video file of the video files and a second expiration date for a second video file of the video files, and wherein the first expiration date is different from the second expiration date;
determine whether a particular video file of the video files has expired,
wherein the first video file expires based on the first expiration date and the second video file expires based on the second expiration, and wherein when the file expiration data includes both the first expiration date and a number of play times for the first video file, the first video file expires on an earlier of the first expiration date and being played the number of play times; and remove the particular video file from the play list; and a distribution module to transmit the play list and the remaining video files to the media device for storage and display of remaining video files indicated in the play list from the media device in connection with the custom content channel.

21. The content transmission system of claim 20, further comprising a database to store the play list and the remaining video files.

22. The content transmission system of claim 21, wherein the distribution module is further to retrieve the stored play list and the remaining video files from the database and to transmit the play list and the remaining video files via a channel to the media device.

23. A computer-readable storage device storing instructions that, when executed by a processor, cause the processor to perform operations including:

receiving a selection of a channel via a media device;

determining whether the channel is a custom content channel;

accessing a play list associated with the custom content channel based on the determination, the play list identifying media files stored at the media device, the play list including file expiration data that identifies expiration rules for the media files, wherein the file expiration data includes a first expiration date for a first media file of the media files and a second expiration date for a second media file of the media files, and wherein the first expiration date is different from the second expiration date;

determining whether a particular media file of the media files has expired, wherein the first media file expires based on the first expiration date and the second media file expires based on the second expiration, and wherein when the file expiration data includes both the first expiration date and a number of play times for the first media file, the first media file expires on an earlier of the first expiration date and being played the number of play times;

removing the particular media file from the play list; and playing the remaining media files via a display device coupled to the media device.

24. The method of claim 8, further comprising receiving a selection of a second remote control key of the plurality of remote control keys and playing the first video file at a first location in the first video file, wherein the remote control key mapping data further identifies a location in the particular video file, and wherein the remote control key mapping data further maps the first location in the first video file to the second remote control key.

* * * * *